(12) United States Patent
Smith

(10) Patent No.: US 6,627,677 B2
(45) Date of Patent: Sep. 30, 2003

(54) INK JET INKS AND METHODS

(75) Inventor: Brian Smith, Kent (GB)

(73) Assignee: Sericol Limited, Kent (GB)

( * ) Notice: Subject to any disclaimer, the term of this patent is extended or adjusted under 35 U.S.C. 154(b) by 0 days.

(21) Appl. No.: 09/888,609

(22) Filed: Jun. 26, 2001

(65) Prior Publication Data

US 2002/0004539 A1 Jan. 10, 2002

Related U.S. Application Data

(63) Continuation of application No. 09/462,908, filed as application No. PCT/GB97/02106 on Jun. 5, 1997, now Pat. No. 6,326,419.

(51) Int. Cl.$^7$ ............... C09D 11/10; C08F 2/46; C08J 3/28; C08K 5/07; C08K 5/5313
(52) U.S. Cl. ............ 523/160; 524/589; 524/590; 524/556; 522/39; 522/64; 522/85
(58) Field of Search ............... 523/160, 161; 524/589, 590, 556, 560; 347/100, 105, 106; 522/42, 39, 64, 85

(56) References Cited

U.S. PATENT DOCUMENTS

| | | |
|---|---|---|
| 4,978,969 A | 12/1990 | Chieng |
| 5,013,768 A | 5/1991 | Kiriyama et al. |
| 5,212,271 A | 5/1993 | Beckett et al. |
| 5,623,001 A | 4/1997 | Figov |
| 5,629,359 A | 5/1997 | Peeters et al. |
| 5,744,519 A | 4/1998 | Heraud et al. ......... 523/160 |
| 5,830,927 A | 11/1998 | Vanderhoff et al. |
| 5,854,300 A | 12/1998 | Gould et al. |
| 6,294,592 B1 | 9/2001 | Herrmann et al. ......... 522/75 |
| 6,310,115 B1 | 10/2001 | Vanmaele et al. ......... 522/25 |

FOREIGN PATENT DOCUMENTS

| | | |
|---|---|---|
| EP | 407054 A1 | 1/1991 |
| EP | 0 658 607 A1 | 6/1995 |
| EP | 0 658 607 | 6/1995 |
| EP | 0 672 538 A1 | 9/1995 |
| GB | 2084591 | 4/1992 |
| GB | 2256874 | 12/1992 |
| WO | WO 94/11123 | 5/1994 |

OTHER PUBLICATIONS

English Translation of JP 07041712 A (1995).
Section Ch, Week 9516, Derwent Publications Ltd., London, GB; Class A97, AN 95–11887 XP002061516 and JP 07 041 712 A (Osaka Sealing Insatsu KK), Feb. 10, 1995.
Leach et al, "The Printing Ink Manual", 5$^{th}$ ed., pp. 678–698. (1993).
Creagh–Dexter, "UV–Reactive Jet Inks", BIS Strategic Decisions 19$^{th}$ Annual European Ink Jet Printing Comference, Mar. 20–22, 1996.

*Primary Examiner*—Vasu Jagannathan
*Assistant Examiner*—Callie E. Shosho
(74) *Attorney, Agent, or Firm*—Nixon & Vanderhye P.C.

(57) ABSTRACT

A water-based, flash-curable ink jet ink that is capable of adhering to plastic substrates, such as flexible polyvinyl chloride, the ink comprising: a) at least one water-dispersible or water-soluble acrylate polymerizable material; b) at least one polymerizable material that is capable of softening the substrate in part or in full and is resistant to hydrolysis; c) at least one colorant such as a pigment, a dye or both a pigment and a dye; and d) at least one UV photoinitiator.

27 Claims, No Drawings

INK JET INKS AND METHODS

This application is a continuation of application Ser. No. 09/462,908 filed Jan. 18, 2000, now U.S. Pat. No. 6,376,419 which was a U.S. national phase application of PCT/GB97/02106, the entire content of which is hereby incorporated by reference in this application.

The present invention concerns an ink jet ink, and in particular a water-based, flash-curable ink jet ink that is capable of adhering to difficult substrates such as matt or gloss uncoated vinyl surfaces.

Printed ink jet inks on substrates are currently cured by medium and high pressure mercury vapour UV lamps. One of the disadvantages of using these lamps is that they are switched on for long periods of time which causes a high degree of heat to be produced and makes it necessary to have sophisticated cooling equipment. The cooling equipment produces either a high air flow or water cooling. The cooling equipment is bulky and it is expensive to incorporate it into an ink jet printing machine. Failure to cool the UV lamp causes distortion of the substrate. The other disadvantages of using a standard UV lamp are: surfaces exposed to the UV lamp need to be equidistant from the lamp in order to achieve uniform curing; and the UV lamp can cause yellowing of the cured surface.

WO 94/11123 has overcome the disadvantages of a standard UV-curable lamp by proposing the use of a high energy electronic flash source and the use of photoinitiators that correspond to the radiation emitted from the flash source. WO 94/11123 discloses a flash curable protective coating that is printed on to optical articles made of plastic (see Example 6). The protective coating comprises 30–40 parts multifunctional melamine acrylate; 70–60 parts trifunctional reactive thinner; 0.5–1.5 parts p-phenyl benzophenone; 1.5–3 parts methyl methyl thiophenyl morpholinopropane; and 0.1–0.5 parts polyether modified dimethyl polysiloxane copolymers.

The inventor of the present invention coated flexible polyvinyl chloride with the protective coating disclosed in Example 6 of WO 94/11123 and found that the coating cracked badly when the polyvinyl chloride was folded through 180°. The protective coating disclosed in WO 94/11123 is therefore not suitable for printing on to difficult plastic substrates such as flexible polyvinyl chloride.

The present invention is concerned with the problem of providing a water-based, flash-curable ink jet ink that is capable of adhering to difficult plastic substrates such as flexible polyvinyl chloride laminates that are used in display signs.

In accordance with the present invention there is provided a water-based, flash-curable ink that is capable of adhering to difficult plastic substrates such as flexible polyvinyl chloride, the ink comprising:

a) at least one water dispersible or water soluble acrylate polymerisable material;
b) at least one polymerisable material that is capable of softening the substrate in part or in full and is resistant to hydrolysis;
c) a colourant such as a pigment, a dye or both a pigment and a dye; and
d) at least one UV photoinitiator.

The present inventors have found that the ink defined above is capable of adhering to difficult plastic substrates such as flexible polyvinyl chloride.

By the term 'polymerisable material' we intend to include monomers, prepolymers and oligomers.

The water dispersible or water soluble acrylate polymerisable material is preferably a water dispersible or water soluble urethane acrylate oligomer.

The polymerisable material in part b) is preferably a monomer, and the monomer is preferably 1,6-hexane diol diacrylate (HDDA). HDDA is a difunctional acrylate that offers a high cure rate. HDDA also exhibits excellent compatibility with and solvency for other oligomers and additives used in the ink.

The water dispersible or water soluble acrylate polymerisable material may be non-ionic or anionic. The water dispersible or water soluble acrylate polymerisable material preferably has a molecular weight between 400 and 1,500, more preferably between 700 and 1,100, as measured by size exclusion chromatography. The non-volatile content of the polymerisable material may be between 10 and 100%.

The photoinitiator may comprise one or more photoinitiators and also a synergist. The photoinitiator preferably has a quantum yield in the range 0.1 to 1.0. The photoinitiator should not function as a chain transfer agent or terminating agent.

The preferred photoinitiators are Lucerin TPO acyl phosphine oxide (sold by BASF), Irgacure 369 (sold by Ciba-Geigy) and Darocure 1173 (sold by Ciba-Geigy). Darocure 1173 is a useful solvent for the Lucerin TPO and the Irgacure 369. The Lucerin TPO and Irgacure 369 are preferably used in amounts ranging from 0:1 to 1.0%, based on oligomer solids. The Irgacure is preferably used in an amount ranging from 0.1 to 3.0%, based on oligomer solids. 4-benzoyl biphenyl is also a useful photoinitiator.

The pigment may be dispersed in the ink using any one of the known methods that produces a fine particle size of less than 1 micron. The pigment may also be added to the ink in a dispersed form.

Examples of suitable pigments are: Yellow 13 and 83; Red 9, 184 and 188; Blue 15:3; Green 7; and Black 7. The reader is directed to U.S. Pat. No. 5,160,372 for further examples of suitable pigments.

The dye may be selected from known-dyes that are used in ink jet systems. The reader is directed to U.S. Pat. No. 5,160,372 for examples of suitable dyes.

The ink can include any of the usual additives that are present such as: surfactants, UV stabilisers, waxes and rheology modifiers.

The present invention will now be described by way of the following Examples:

EXAMPLES

Test to Find a Polymerisable Material that is Capable of Softening a Plastic Substrate such as Polyvinyl Chloride and is Resistant to Hydrolysis In order to test whether any of the selection of monomers listed below are capable of softening a plastic substrate such as polyvinyl chloride, a small drop of each of the monomers was placed on to a polyvinyl chloride substrate. After being left for 5 minutes, the monomers were removed from the polyvinyl chloride using a soft cloth and the surface of the polyvinyl chloride was examined for softening and marking. The results are as follows:

| Monomer | Result |
| --- | --- |
| Tripropyleneglycol diacrylate | no mark |
| Ethoxylated trimethylol propane triacrylate | no mark |
| Trimethyl propane triacrylate | no mark |
| 2 phenoxyethyl acrylate | no mark |
| Di-propylene glycol diacrylate | no mark |
| N vinyl caprolactam* | substrate softened |
| N N di-vinyl imidazole* | substrate softened |
| N vinyl pyrolidone | substrate softened |
| Hexane diol diacrylate | substrate softened |
| N vinyl formamide | substrate softened |
| Neopentyl glycol diacrylate | no mark |
| Octyldecyl acrylate | substrate softened |
| Iso bornyl acrylate | no mark |
| Lauryl acrylate | no mark |

* 50% solutions in TPGDA since they are solid at ambient temperature.

The results show that only six out of the fifteen monomers that were tested were capable of softening the polyvinyl chloride surface.

Test for Monomer's Hydrolysis Resistance:

In order for the monomer to be used in a water-based ink, it needs to be resistant to hydrolysis. The five monomers that were capable of softening the polyvinyl chloride were tested for their resistance to hydrolysis. The monomers were tested for their hydrolytic stability under both acidic and basic conditions. Ten percent dispersions of the monomers were prepared in deionised water, with the pH being adjusted to 5 and 9 with dilute HCl and NaOH respectively. The samples were stored for 1 week at 40° C. and then checked for degradation using HPLC. Of the monomers tested, hexane diol diacrylate (HDDA) gave the best resistance properties.

Test for Monomer's Compatibility with other Components in the Ink:

The monomer's compatibility with other components in the ink was tested by formulating the ink and checking for general problems such as separation on storage. The test was carried out using HDDA and the HDDA was found to be compatible with the ink's other components.

Test to Find a Water-Dispersible or Water-Soluble Acrylate Polymerisable Material Test for Solubility:

In the inks of the present invention the water-dispersible or water-soluble acrylate polymerisable material is preferably soluble in the polymerisable material that softens the substrate, so that it imparts stability to the polymer dispersion. We tested whether a selection of acrylate oligomers were soluble in HDDA by preparing 25% solids solutions of a range of oligomer types in HDDA and the solutions were examined for clarity and stability towards separation. The solubility is largely linked to molecular weight within a group of similar oligomers: the lower molecular weight examples have the best solubility. High molecular weight examples, however, impart good flexibility so a combination of both high and low molecular weight examples is-used to give optimum performance.

The test revealed that acrylate and methacrylate copolymers are the preferred oligomers.

Hydrolytic Stability:

The acrylate oligomers were not tested for their hydrolytic stability in isolation. No particular problems were encountered with hydrolytic stability of the oligomers used in the previous tests. Methacrylate copolymers were selected on the basis that their other properties were suitable and that they are well known for their hydrolytic stability. Experimental ink samples were however checked for changes in pH on storage. A decrease in pH indicates hydrolysis problems.

Test to Find a Suitable Photoinitiator

In order to maximise on the efficiency of the initiators, it is necessary to match the absorption characteristics of the initiator and the pigment with the output from the energy source. The wavelength and radiant energy of a light source may be measured with a Spectral Radiometer. The absorption of a photoinitiator may be determined using a scanning UV/visible spectrometer.

Test Results

The following photoinitiators were found to be suitable:

| | UV Absorption Range |
| --- | --- |
| Lucerin TPO acyl phosphine oxide | 355 to 410 nm |
| Irgacure 369 | 280 to 440 nm (peaking at 340 nm) |
| Daracure 1173 | 225 to 275 nm (peaking at 245 nm) |

4 benzoyl biphenyl 225 to 325 nm (peaking at 290 nm)

Preparation of Inks

The following inks were prepared:

Example 1

| | | Parts w/w |
| --- | --- | --- |
| Part A | Actilane SP061 | 10 |
| | HDDA | 89 |
| | Igepal CA897 (emulsifying agent) | 1 |
| | Water | 100 |
| Part B | Actilane 640 (water dispersible urethane acrylate) | 200 |
| | Lucerin TPO | 2 |
| | Pigment dispersion | 10 |
| | Fluorad FC129 (surfactant) | 0.6 |
| | Methyl diethanolamine (pH adjuster) | 1 |

Example 2

| Part A | Actilane SP061 | 10 |
| --- | --- | --- |
| | HDDA | 89 |
| | Igepal CA897 (emulsifying agent) | 1 |
| | Water | 100 |
| Part B | Halwedol 14/40 w | 200 |
| | Lucerin TPO | 2 |
| | Pigment dispersion | 10 |
| | Fluorad FC129 (surfactant) | 0.6 |
| | Methyl diethanolamine | 1 |

Fluorad FC129 (surfactant) 0.6
Methyl diethanolamine 1

Example 3

| Part A | Actilane SP061 | 10 |
|---|---|---|
|  | HDDA (monomer) | 89 |
|  | Igepal CA897 (emulsifying agent) | 1 |
|  | Water | 100 |
| Part B | Actilane 640 | 200 |
|  | Lucerin TPO | 1.4 |
|  | Darocure IM3 | 8 |
|  | Pigment dispersion | 8 |
|  | Fluorad FC129 (surfactant) | 0.6 |

In the above Examples, best results were obtained using from 40 to 60% by weight of Part A and from 60 to 40% by weight of Part B.

Comparative Example 1

| Part A | Actilane SP061 | 10 |
|---|---|---|
|  | TPGDA | 89 |
|  | Igepal CA897 | 1 |
|  | Water | 100 |
| Part B | Actilane 640 | 200 |
|  | Lucerin TPO | 0.8 |
|  | Benzophenone | 0.5 |
|  | Darocure 1173 | 0.5 |
|  | Irgocur | 1 |
|  | Pigment dispersion | 8 |
|  | Fluorad FC129 | 0.6 |

Fluorad FC129 0.6

Comparative Example 2

| Part A | Actilane SP061 | 10 |
|---|---|---|
|  | HDDA | 89 |
|  | Igepal CA897 | 1 |
|  | Water | 100 |
| Part B | Actilane 640 | 100 |
|  | Isopropyl thioxanthone | 3 |
|  | (available as QUANTACURE ITX from international Biosynthetics) |  |
|  | Ethyl 4 di-methylanions benzoate | 2 |
|  | (available as QUANTACURE EPD from International Biosynthetics) |  |
|  | Pigment dispersion | 8 |
|  | Fluorad FC129 | 0.6 |

Method of Preparation of Inks

The inks were prepared by the following steps:
a) the Actilane SP061 was dissolved in the HDDA;
b) the emulsifying agent was dissolved in the water;
c) the dissolved Actilane SP061 was added to the dissolved emulsifying agent using a Silverson disperser running at high speed and fitted with an emulsifying head.
The emulsion was stirred for approximately 30 minutes;
d) the water dispersible urethane acrylate was added to the emulsion using the Silverson at slow speed;
e) the photoinitiator was added to the emulsion and the emulsion was stirred;
f) the speed of the Silverson disperser was increased and the pigment dispersion was added;
g) the surfactant and pH adjuster were added to the emulsion while the emulsion was being slowly stirred It is important to note that the particles in the ink should be less than 5 microns in diameter, and more preferably less than 1 micron. This is because ink jet heads have nozzles that are 50 microns in diameter and large particles in the ink cause blockages.

Test Method

The inks were tested for their adhesion to difficult plastic substrates using the following test method:

The inks were applied to a plastic laminate, such as those sold under the trade names of MACTAC MACSCREEN or INTERCOAT P, to a coat weight of 67 gsm (equivalent to 600×600 dpi). After applying the inks to the substrate, the inks were cured using 10 flashes at 600 joules/flash.

To test for adhesion of the films to the substrate:
1) the films were scratched with a finger nail and then they were checked for damage;
2) the substrate was folded through 180° and the films were checked for damage at the fold line; and
3) Cellotape was placed on to the films and pressed down. It was then ripped from the film and the film was checked for damage.

Test Results

The inks prepared in Examples 1, 2 and 3 exhibited good adhesion to an uncoated gloss polyvinyl chloride surface. The ink prepared in Comparative Example 1 exhibited poor adhesion to an uncoated gloss polyvinyl chloride surface. The ink prepared in Comparative Example 2 did not cure under the conditions of the test.

What is claimed is:

1. A water-based, flash-curable ink jet ink that adheres to a plastic substrate, the ink comprising:
    a) at least one water-dispersible or water-soluble acrylate polymerizable material;
    b) at least one hydrolysis-resistant polymerizable material that at least partially softens the plastic substrate when in contact therewith,
    c) at least one colorant which is selected from the group consisting of pigments, dyes and mixtures thereof, and
    d) at least one UV photoinitiator, and wherein particles present in said ink jet ink are of a sufficiently small size of less than 5 microns to prevent blockages in ink jet heads having nozzles through which the ink jet ink passes.

2. The water-based, flash-curable ink jet ink as claimed in claim 1, wherein the water dispersible or water soluble acrylate polymerizable material is a water dispersible or water soluble urethane acrylate oligomer.

3. The water-based, flash-curable ink jet ink as claimed in claim 2, wherein the oligomer is an acrylate or methacrylate copolymer.

4. The water-based, flash-curable ink jet ink as claimed in claim 1, wherein the hydrolysis-resistant polymerizable material is a monomer.

5. The water-based, flash-curable ink jet ink as claimed in claim 4, wherein the monomer is hexane diol diacrylate.

6. The water-based, flash-curable ink jet ink as claimed in claim 1, wherein at least 25 parts by weight of water dispersible or water soluble acrylate polymerizable material are dissolved in the hydrolysis-resistant polymerizable material.

7. The water-based, flash-curable ink jet ink as claimed in claim 1, wherein the ink comprises at least 18% of water, based on the total weight of the ink.

8. The water-based, flash-curable ink jet ink as claimed in claim 1, wherein the water-dispersible or water-soluble acrylate polymerizable material is present in the ink in an amount from 5–15% by total weight.

9. The water-based, flash-curable ink jet ink as claimed in claim 1, wherein the ink at least partially softens a flexible polyvinyl chloride substrate when brought into contact therewith.

10. The water-based, flash-curable ink jet ink as claimed in claim 1, wherein the ink comprises at least 25% of water, based on the total weight of the ink.

11. A method of making a water-based, flash curable ink jet ink that adheres to a plastic substrate, the method comprising the steps of:
(a) selecting at least one water-dispersible or water-soluble acrylate polymerisable material;
(b) selecting at least one hydrolysis-resistant polymerisable material that at least partially softens the plastic substrate when in contact therewith;
(c) dissolving the water-dispersible or water-soluble acrylate polymerisable material selected according to step (a) in the polymerisable material selected according to step (b) to obtain a polymerisable mixture; and
(d) adding to the polymerisable mixture at least one photoinitiator and at least one colorant which is selected from the group consisting of pigments, dyes and mixtures thereof to obtain an ink jet ink that is water-based and flash-curable and having particles of a sufficiently small size of less than 5 microns to prevent blockages in ink jet heads having nozzles through which the ink jet ink passes.

12. The method of claim 11, wherein the water dispersible or water soluble acrylate polymerizable material is a water dispersible or water soluble urethane acrylate oligomer.

13. The method of claim 12, wherein the oligomer is an acrylate or methacrylate copolymer.

14. The method of claim 11, wherein the hydrolysis-resistant polymerizable material is a monomer.

15. The method of claim 11, wherein at least 25 parts by weight of water dispersible or water soluble acrylate polymerizable material are dissolved in the hydrolysis-resistant polymerizable material.

16. The method of claim 11, which further comprises the step including at least about 18% of water, based on the total weight of the ink, in the mixture.

17. The method of claim 11, wherein the water-dispersible or water-soluble acrylate polymerizable material is present in an amount from 5–15% by total weight.

18. A printed plastic substrate comprising a plastic substrate and a water-based, flash-curable ink jet ink printed on the substrate, wherein the ink jet ink comprises:
a) at least one water-dispersible or water-soluble acrylate polymerizable material;
b) at least one hydrolysis-resistant polymerizable material that at least partially softens the plastic substrate when in contact therewith,
c) at least one colorant which is selected from the group consisting of pigments, dyes and mixtures thereof, and
d) at least one UV photoinitiator.

19. The printed plastic substrate as claimed in claim 18, wherein the water dispersible or water soluble acrylate polymerizable material is a water dispersible or water soluble urethane acrylate oligomer.

20. The printed plastic substrate as claimed in claim 19, wherein the oligomer is an acrylate or methacrylate copolymer.

21. The printed plastic substrate as claimed in claim 18, wherein, the hydrolysis-resistant polymerizable material is a monomer.

22. The printed plastic substrate as claimed in claim 21, wherein the monomer is hexane diol diacrylate.

23. The printed plastic substrate as claimed in claim 18, wherein at least 25 parts by weight of water dispersible or water soluble acrylate polymerizable material are dissolved in the hydrolysis-resistant polymerizable material.

24. The printed plastic substrate as claimed in claim 18, wherein the ink comprises at least 18% of water, based on the total weight of the ink.

25. The printed plastic substrate as claimed in claim 18, wherein the water-dispersible or water-soluble acrylate polymerizable material is present in the ink in an amount from 5–15% by total weight.

26. The printed plastic substrate as claimed in claim 18, wherein the ink at least partially softens a flexible polyvinyl chloride substrate when brought into contact therewith.

27. The printed plastic substrate as claimed in claim 18, wherein the ink comprises at least 25% of water, based on the total weight of the ink.

\* \* \* \* \*